US011513472B2

(12) United States Patent
Ishikawa et al.

(10) Patent No.: US 11,513,472 B2
(45) Date of Patent: Nov. 29, 2022

(54) IMAGE FORMING APPARATUS WITH CONDENSATION PREVENTION

(71) Applicants: Taisuke Ishikawa, Kanagawa (JP); Junichi Murano, Saitama (JP); Hiroki Ishimitsu, Kanagawa (JP)

(72) Inventors: Taisuke Ishikawa, Kanagawa (JP); Junichi Murano, Saitama (JP); Hiroki Ishimitsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 17/034,482

(22) Filed: Sep. 28, 2020

(65) Prior Publication Data

US 2021/0096509 A1    Apr. 1, 2021

(30) Foreign Application Priority Data

Sep. 30, 2019 (JP) .............................. JP2019-178703

(51) Int. Cl.
  *G03G 21/20* (2006.01)
  *G06K 15/00* (2006.01)
  *G06K 15/16* (2006.01)

(52) U.S. Cl.
  CPC ........... *G03G 21/206* (2013.01); *G06K 15/16* (2013.01); *G06K 15/4025* (2013.01)

(58) Field of Classification Search
  CPC ........................... G03K 15/4025; G03K 15/16
  See application file for complete search history.

(56) References Cited

U.S. PATENT DOCUMENTS

| 2012/0087693 A1* | 4/2012 | Yamaguchi .......... G03G 21/206 399/92 |
| 2019/0278222 A1 | 9/2019 | Ishikawa |
| 2020/0301349 A1 | 9/2020 | Ishikawa et al. |

FOREIGN PATENT DOCUMENTS

| JP | 2004-240270 | 8/2004 | |
| JP | 2007-156418 | 6/2007 | |
| JP | 2016206611 A | * 12/2016 | ............... B65H 1/00 |
| JP | 2017-219867 | 12/2017 | |
| JP | 2020-154056 | 9/2020 | |
| JP | 2021021884 A | * 2/2021 | ........... G03G 21/206 |

OTHER PUBLICATIONS

JP_2016206611_T Machine Translation, Japan, 2016, Hirohisa.*
JP_2021021884_A_T MachineTranslation, Japan, 2021, Hideo.*

* cited by examiner

*Primary Examiner* — Victor Verbitsky
(74) *Attorney, Agent, or Firm* — Harness, Dickey & Pierce, P.L.C.

(57) ABSTRACT

An image forming apparatus configured to perform simplex printing and duplex printing includes a recording medium ejection device, a suction duct, a blower, and a pair of rotating members. The recording medium ejection device includes a recording medium outlet through which a recording medium is ejected outside of the image forming apparatus and a recording medium reverse port through which a part of the recording medium is ejected to reverse the recording medium in the duplex printing. The suction duct includes a suction port to suck air. The blower is disposed in the suction duct and sucks air from the recording medium ejection device to the suction port. The pair of rotating members is disposed between the suction port and at least one of the recording medium outlet and the recording medium reverse port and reverses both sides of the recording medium in the duplex printing.

6 Claims, 8 Drawing Sheets

IMAGE FORMING APPARATUS WITH CONDENSATION PREVENTION

CROSS-REFERENCE TO RELATED APPLICATION

This patent application is based on and claims priority pursuant to 35 U.S.C. § 119(a) to Japanese Patent Application No. 2019-178703, filed on Sep. 30, 2019, in the Japan Patent Office, the entire disclosure of which is hereby incorporated by reference herein.

BACKGROUND

Technical Field

Embodiments of the present disclosure relate to an image forming apparatus.

Description of the Related Art

In an image forming apparatus, there is known a technique to reduce hazardous substances (for example, environmentally hazardous chemical substances such as ultrafine particles (UFPs), volatile organic compounds (VOCs), and dust, or odors).

SUMMARY

In an aspect of the present disclosure, an image forming apparatus configured to perform simplex printing and duplex printing includes a recording medium ejection device, a suction duct, a blower, and a pair of rotating members. The recording medium ejection device includes a recording medium outlet through which a recording medium is ejected outside of the image forming apparatus, and a recording medium reverse port through which a part of the recording medium is ejected outside of the image forming apparatus to reverse the recording medium in the duplex printing. The suction duct includes a suction port to suck air. The blower is disposed in the suction duct and sucks air from the recording medium ejection device to the suction port. The pair of rotating members is disposed between the suction port and at least one of the recording medium outlet and the recording medium reverse port. The pair of rotating members reverses both sides of the recording medium in the duplex printing.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
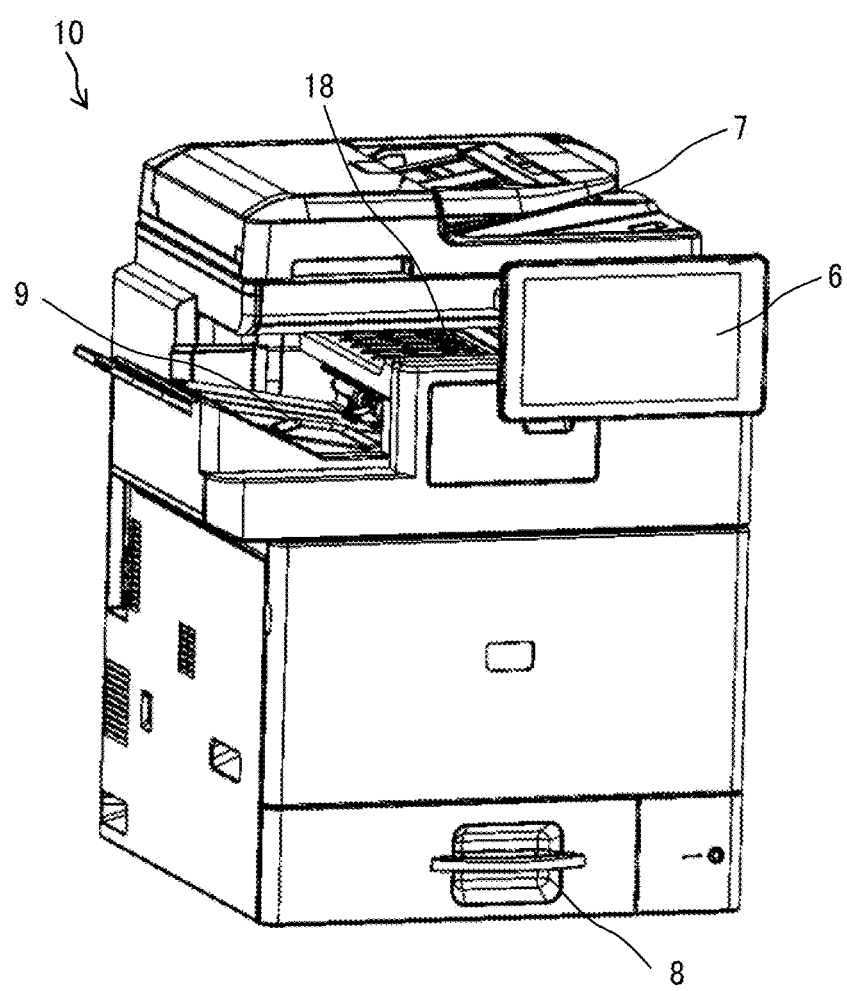
FIG. 1 is an external perspective view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described below with reference to the drawings. For clarity, some of following descriptions and drawings may be appropriately omitted or simplified. In the drawings, the same reference numerals are given to the same components and corresponding parts having the same configurations or functions, and redundant description thereof will be omitted.

According to an embodiment of the present disclosure, a suction port (duct opening) and a pair of rotating members are disposed in a configuration to reduce the amount of hazardous substances and prevent occurrence of a dew condensation image. The suction port is disposed in the vicinity of the pair of rotating members (for example, a pair of conveying rollers) to prevent adhesion of water droplets. The pair of rotating members is disposed between the suction port and an outlet of a recording medium or a reverse port of the recording medium.

An image forming apparatus includes a recording medium ejection device (hereinafter also referred to as an "ejection device" as appropriate). The ejection device includes an outlet and a reverse port of the recording medium. A pair of rotating members is disposed on an inner side of the image forming apparatus from the outlet of the ejection device or the reverse port. In the above-described configuration, air is sucked from an outlet of the ejection device or the reverse port to generate a suction airflow. Thus, airflow into the image forming apparatus from the ejection device is generated. In addition, the pair of rotating members is disposed in a space from the outlet or the reverse port to the suction port so that the pair of rotating members can be effectively exposed to outside air. Such a configuration can remove water droplets adhering to the pair of rotating members during printing. In this way, two functions of reducing the amount of hazardous substances and preventing a dew condensation image can be achieved.

The above-described embodiment of the present disclosure is described in detail with reference to the drawings.

Figure 2:
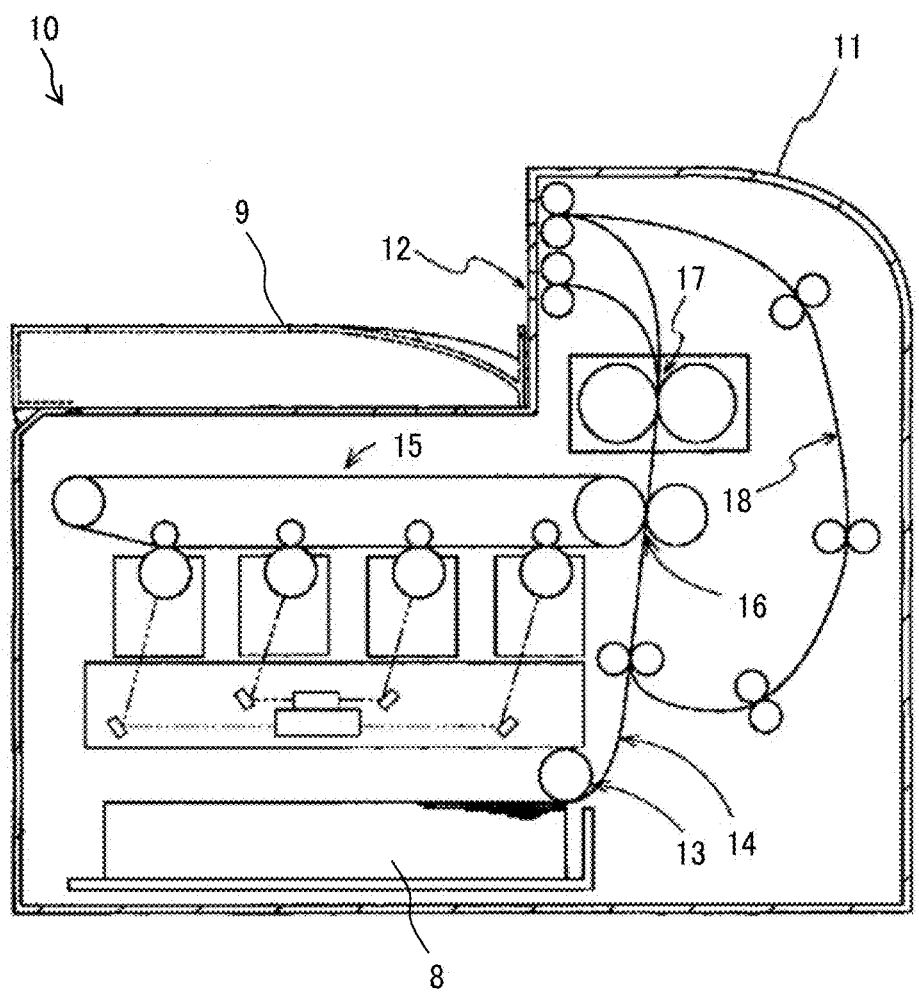
FIG. 2 is a schematic view of an example of an internal configuration of the image forming apparatus according to an embodiment of the present disclosure.

Initially with reference to FIGS. 1 and 2, a description is given of an overall configuration of an image forming apparatus according to an embodiment of the present disclosure.

FIG. 1 is an external view of the image forming apparatus according to the present embodiment. An image forming apparatus 10 according to the present embodiment includes an operation panel 6, an auto document feeder (ADF) 7, a recording medium supply tray 8, a recording medium ejection tray 9, and a duplex reverse unit 18. The ADF 7 feeds and conveys an original document. The recording medium supply tray 8 stores recording media in a stackable manner before image recording is performed on the recording media. A recording medium with a recorded image is ejected to the recording medium ejection tray 9.

FIG. 2 is a schematic diagram of an example of the internal configuration of the image forming apparatus of FIG. 1. The image forming apparatus 10 includes a housing 11, a recording medium ejection device 12, a recording medium supply unit 13, a recording medium conveyance path 14, a toner image forming device 15, a transfer device 16, a fixing device 17, and a duplex reverse unit 18. The housing 11 forms an exterior shape of the image forming apparatus 10 and houses functional devices. The recording medium ejection device 12 is disposed on a top surface of the housing 11 and ejects a recording medium on which an image is recorded to the recording medium ejection tray 9. The recording medium conveyance path 14 is formed to connect the recording medium supply unit 13 and the recording medium ejection device 12. The toner image forming device 15 is disposed between the recording medium supply unit 13 and the recording medium ejection device 12, and forms a toner image based on image data. The transfer device 16 transfers the toner image formed in the toner image forming device 15 onto a recording medium on the recording medium conveyance path 14. The fixing device 17 (also referred to as "fixing unit") is provided between the transfer device 16 and the recording medium ejection device 12 and presses and heats the recording medium on which the toner image has been transferred to fix the toner image onto the recording medium. The duplex reverse unit 18 is connected to the recording medium conveyance path 14 so as to straddle the transfer device 16 and the fixing device 17.

The above described image forming apparatus 10 performs image recording by a process in which the toner image formed based on image data is transferred and fixed onto the recording medium and the recording medium is ejected from the recording medium ejection device 12, which is disposed on the top surface of the housing 11, to the recording medium ejection tray 9.

Next, an embodiment of the present disclosure is described. Hereinafter, a sheet of paper is described as an example of the recording medium. The recording medium is not limited to the sheet of paper and may be an overhead projector (OHP) sheet, an OHP film, a cloth, or the like. In addition, the sheet may be a thick paper, a postcard, an envelope, a thin paper, a coated paper (a coated paper, an art paper, or the like), an uneven paper such as Japan paper, a tracing paper, or the like, in addition to a plain paper.

A main part of an image forming apparatus according to an embodiment is described with reference to FIG. 3.

Sheet Conveyance Passage in Image Formation

In an image forming apparatus 10 according to the present embodiment, when simplex printing is performed, a sheet is fed, registered, transferred, and then conveyed to the sheet ejection unit 5 serving as a sheet ejection region via the fixing unit 20, the pairs of vertical conveyance rollers 31a and vertical conveyance rollers 31b, a lower portion of a branch claw 34, and the pairs of sheet ejection rollers 32a and the sheet ejection rollers 32b. A sheet ejected from a sheet ejection port 51 as a recording medium outlet is stacked on a sheet ejection tray 50. After the sheet passes through the fixing unit 20 through the sheet feeding, the registration, and the transfer, the image forming apparatus 10 forms and fixes an image on a first surface of the sheet. In this step, the sheet is sequentially conveyed from a conveyance path a to a conveyance path b (conveyance path a→b).

At the time of duplex printing, the sheet is fed, registered, and transferred. After passing through the fixing unit 20 and the pairs of vertical conveyance rollers 31a and vertical conveyance rollers 31b, the sheet passes above the branch claw 34 and is conveyed to the sheet reverse port 52 as a recording medium reverse port by the pairs of duplex reverse rollers 33a and duplex reverse rollers 33b. After the sheet passes through the fixing unit 20 through the sheet feeding, the registration, and the transfer, the image forming apparatus 10 forms and fixes an image on a first surface of the sheet. In this step, the sheet is conveyed from the conveyance path a to the conveyance paths c and d (conveyance paths a→c→d) sequentially.

The image forming apparatus 10 confirms that the sheet has reached a predetermined position by a sheet end detection sensor, and reversely rotates the duplex reverse rollers 33a to switch back the sheet. After the switchback, the sheet passes through the conveyance path e (conveyance path d e) and enters the registration and the transfer step again. The image forming apparatus 10 forms and fixes an image on a second surface of the sheet. After the image is fixed on the second surface of the sheet, the sheet is sequentially conveyed from the conveyance path a to the conveyance path b and stacked on the sheet ejection tray 50, as in the case of simplex printing.

Mechanism of Occurrence of Dew Condensation Image

When duplex printing is performed immediately after simplex printing, white spots due to water droplets may occur on the second surface of the sheet in duplex printing.

When simplex printing is continuously performed, a large amount of water vapor is released from sheets heated by the fixing unit 20. The water vapor diffuses inside of the image forming apparatus 10 in accordance with the conveyance of the sheets and a natural upward airflow. As a result, a large amount of water droplets adhere mainly to vicinities of the conveyance paths a and b. In addition, water droplets are likely to adhere to the conveyance path d, the duplex reversing rollers 33a, and the duplex reversing rollers 33b, which are disposed above the conveyance path b. When the simplex printing is continued, the water droplets on the conveying paths a and b, the vertical conveyance rollers 31a, and the vertical conveyance rollers 31b are wiped off by the continuously passing sheet, and the conveying members receive the heat of the sheet to be heated, so that the water droplets decrease.

However, the conveyance path d, the duplex reverse rollers 33a, and the duplex reverse rollers 33b are still cold, and the adhesion of the water droplets increases.

If duplex printing is performed in such a state immediately after simplex printing, the sheet with the image fixed on the first surface is sandwiched between the duplex reverse rollers 33a and the duplex reverse rollers 33b containing a large amount of the water droplets when the sheet with the image fixed on the first surface passes through the conveyance path d. Accordingly, the water droplets are transferred to the sheet. Then, when the sheet is switched back at the sheet reverse port 52 and an image is transferred onto the second surface of the sheet through the conveyance path e, toner on a portion of the sheet including water droplets is removed.

Hereinafter, the image of abnormal quality having white spots due to the water droplets is referred to as a "condensation image".

In general, as a characteristic of adherence of water droplets, the influence of the water droplets on pairs of conveyance rollers is more conspicuous in the condensation image than the influence of the water droplets on conveyance ribs. A conveyance guide plate includes ribs and is disposed horizontally with respect to a direction of conveyance of the sheet. For this reason, if water droplets on the conveyance guide plate are transferred onto a sheet, the water droplets become thin lines and are less noticeable. On the other hand, when a sheet passes through the pairs of conveyance rollers, the sheet is sandwiched by the pairs of conveyance rollers, the water droplets corresponding to the widths of the conveyance rollers adhere to the sheet. In addition, each roller of the pairs of conveyance rollers rotate in close contact with each other. Accordingly, when water droplets adhere to the pairs of conveyance rollers, the adhesion of the water droplets to the sheet is highly likely to occur.

Therefore, reliably removing the water droplets from the pairs of conveyance rollers is effective to take measures against the dew condensation image.

Release of Environmentally Hazardous Chemical Substances and Release of Odor

It is known that various environmentally hazardous chemical substances such as UFPs and VOC are generated when toner is heated by a fixing unit. It is also known that a specific odor is generated by heating toner. If measures are not taken, hazardous substances might diffuse from an exhaust port and a sheet ejection port of an image forming apparatus, resulting in health damage and feeling of sickness. As countermeasures against these disadvantages, a technique is widely known in which hazardous substances are reduced by passing air through a dedicated removal filter in airflow passage.

Configuration Example of an Image Forming Apparatus According to an Embodiment of the Present Disclosure An image forming apparatus according to an embodiment of the present disclosure is an apparatus capable of performing simplex printing and duplex printing, and includes a recording medium ejector, a suction duct, a blower, and a pair of rotating members.

The recording medium ejection device has a function of ejecting the recording medium outside of the image forming apparatus, and includes a recording medium outlet through which the recording medium is ejected outside of the image forming apparatus, and a recording medium reverse port through which a part of the recording medium is ejected outside of the image forming apparatus to reverse the recording medium at the time of duplex printing.

The suction duct has a suction port to suck air.

A blower is disposed in the suction duct to suck (blow) air from the recording medium ejection device to the suction port.

The pair of rotating members is disposed between at least one of the recording medium outlet and the recording medium reverse port and the suction port, and reverses sides of the recording medium at the time of duplex printing. The pair of rotating members are members that convey the recording medium, and is, for example, a pair of conveying rollers.

Figure 3:
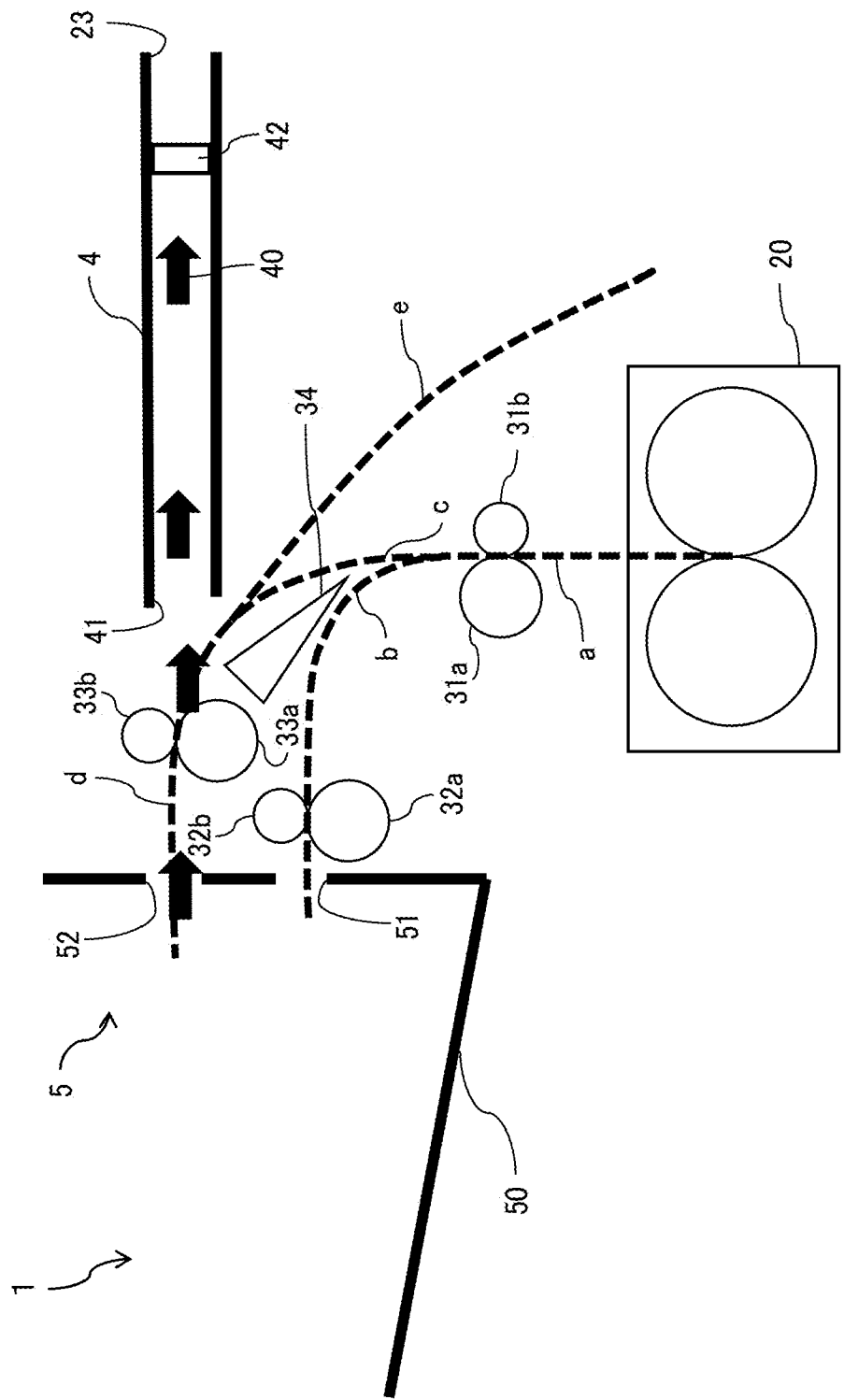
FIG. 3 is a schematic diagram of a main part of an image forming apparatus according to an embodiment of the present disclosure.

The image forming apparatus 10 illustrated in FIG. 3 includes a sheet ejector unit 5 as a recording medium ejection device, an outside air suction duct 4 as a suction duct, a combination of the duplex reverse roller 33a and the duplex reverse roller 33b as the pair of rotating members, a blower 42 as a blower, the sheet ejection port 51 as a recording medium outlet, the sheet reverse port 52 as a recording medium reverse port, and a suction duct inlet 41 as a suction port.

Here, the pair of the rotating members are provided between at least one of the recording medium outlet and the recording medium reversing entrance and the suction port according to an embodiment of the present disclosure. For example, the embodiment is in any one of the following states 1 and 2, or a combination of the state 1 and 2. In the state 1, at least a part of the pair of the rotating members is provided on a straight line connecting the recording medium outlet and the suction port. In the state 2, at least a part of the pair of the rotating members is provided on a straight line connecting the recording medium reverse port and the suction port.

The "straight line connecting the recording medium outlet and the suction port" is a straight line connecting any point of an opening of the recording medium outlet and any point of an opening of the suction port. Similarly, the "straight line connecting the recording medium reverse port and the suction port" is a straight line connecting any point of the opening of the recording medium reverse port and any point of the opening of the suction port.

In such a configuration, the pair of the rotating members is provided in a path of the airflow sucked from the recording medium ejection device to the suction port by the blower. Thus, air in the airflow can be blown to the pair of the rotating members.

Hereinafter, a case in which the pair of rotating members is provided on the straight line connecting the recording medium reverse port and the suction port is described as an example.

In the configuration example illustrated in FIG. 3, the outside air suction duct 4 is provided, and outside air is sucked from the sheet ejection unit 5 by the blower 42 to generate the airflow 40. Further, the duplex reverse roller 33a and the duplex reverse roller 33b are disposed between the suction duct inlet 41 and the sheet reverse port 52 to prevent the duplex reverse roller 33a and the duplex reverse roller 33b from dew formation.

During simplex printing, water vapor is sprinkled on the duplex reverse roller 33a and the duplex reverse roller 33b. However, since the airflow 40 is flowing, the duplex reverse roller 33a and the duplex reverse roller 33b can be brought into contact with air having a small amount of water vapor. Such a configuration can prevent water droplets from adhering to the duplex reverse rollers 33a and the duplex reverse rollers 33b. Thus, generation of the condensation image can be prevented in duplex printing performed after simplex printing.

In addition, hazardous substances such as UFPs, VOC, and odor leaked to the sheet ejection unit 5 are mixed with outside air and return inside of the image forming apparatus 10 from the sheet reverse port 52.

In particular, aggregation of UFPs occurs with time and the number of UFPs decreases. Thus, the amount of UFPs emitted from the image forming apparatus 10 can be reduced when the UFPs is kept in the image forming apparatus 10 for a long time. For this reason, in the present configuration, returning the sheet inside of the image forming apparatus 10 again can obtain an effect of reducing emission of hazardous substances in the sheet ejection unit 5.

The above-described configuration can both prevent condensation image from being generated and reduce the amount of hazardous substances emitted.

Figure 4:
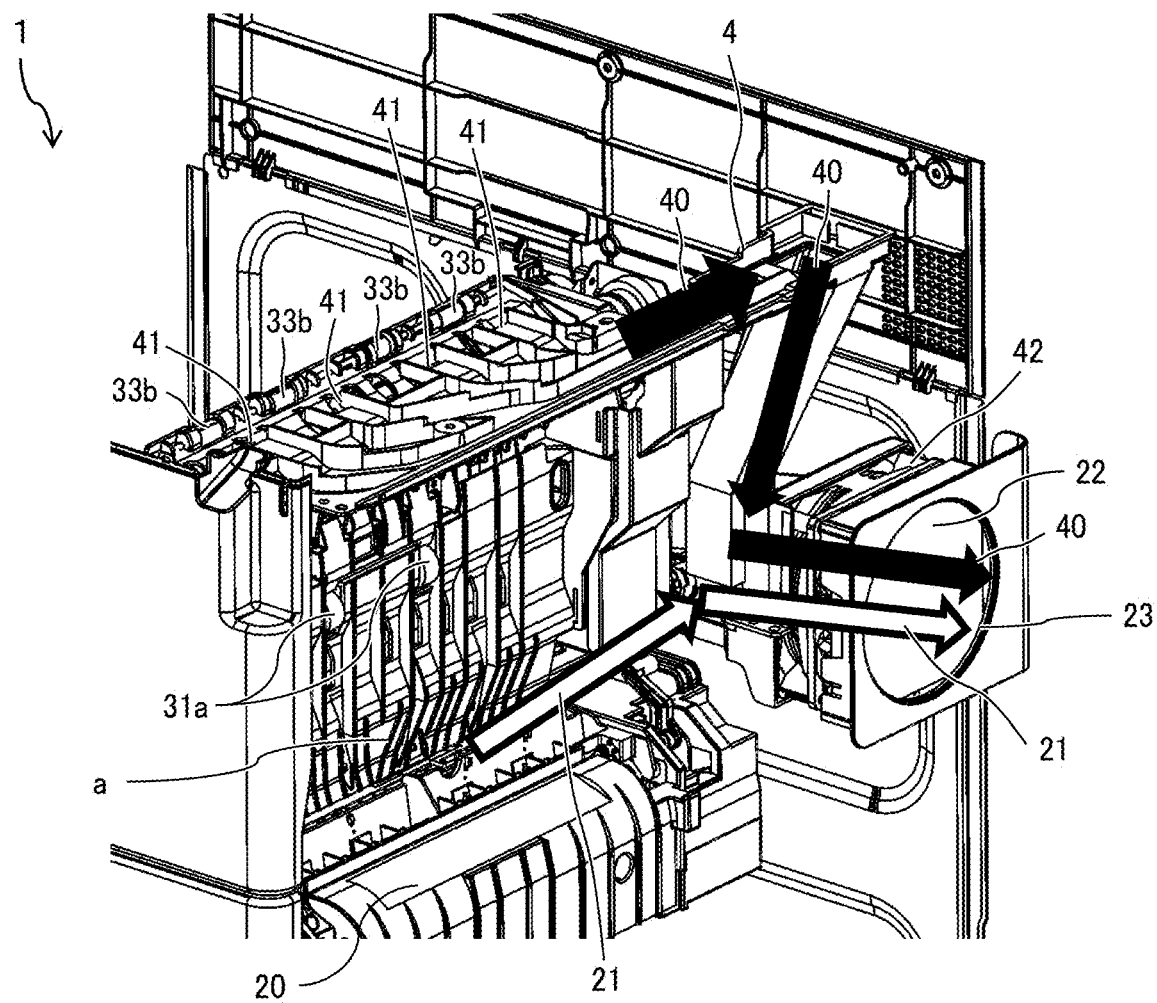
FIG. 4 is a perspective view of an example of the configuration of an exhaust mechanism employing an outside air suction duct.

Next, a specific example of the configuration of an exhaust mechanism employing the outside air suction duct 4 is described with reference to FIG. 4. FIG. 4 is a view of a part of the image forming apparatus 10, in which a top surface of the image forming apparatus 10 is removed so that an inside of the outside air suction duct 4 is visible. The outside air suction duct 4 is surrounded by the top surface, and air is made to flow in the outside air suction duct 4 by the blower 42. In FIG. 4, a part of a lateral side of the image forming apparatus 10 is removed so that the inside of the image forming apparatus 10 is visible.

The outside air suction duct 4 includes suction duct inlets 41 and the blower 42. Each of the suction duct inlets 41 is disposed in a vicinity of the duplex reverse roller 33b. The blower 42 also exhausts heat of the fixing unit 20 and has a function of generating a fixing exhaust heat airflow 21 and emitting excess heat generated in an upper portion of the fixing unit 20 outside of the apparatus. In FIG. 4, the fixing exhaust heat airflow 21 is indicated by white arrows.

The outside air suction duct 4 may include an opening, for example, between the suction duct inlet 41 and the blower 42 as a function of emitting (sucking) air around the fixing unit 20. The opening may be provided, for example, in the vicinity of the fixing unit 20. The opening may be provided so as to be capable of sucking air around the fixing unit 20 (air in a space in which the fixing unit 20 is disposed).

Thus, the airflow 40 flowing in the outside air suction duct 4 merges with the fixing exhaust heat airflow 21 before the blower 42. After merging, the airflow 40 passes through a filter 22 in a mixed state in the outside air suction duct 4 and is emitted outside of the image forming apparatus 10 from the exhaust port 23.

In addition, in the configuration example of FIG. 4, a configuration example in which the blower 42 also has a function of emitting fixing exhaust heat is illustrated. However, in general, image forming apparatuses include one fan to exhaust fixing heat. Therefore, as illustrated in FIG. 4, adopting the merging method, in which the airflow 40 and the fixing exhaust heat airflow 21 are merged, can obviate a need to increase the number of fans even when the outside air suction duct 4 is installed. In this way, such a configuration in which an existing fan is used and the ducts are merged can obtain merits such as cost reduction and noise reduction.

Furthermore, installing the filter 22 in the airflow path enables to effectively collect and remove (at least one of collecting and removing) hazardous substances such as UFPs, VOCs, and odors. The filter 22 is a filter effective for collecting and removing at least one of UFPs, VOC and odor. Such a configuration in which a filter effective for each hazardous substance is arranged in series with respect to the airflow path to sequentially collect and remove the hazardous substance may be provided to obtain a plurality of effects. According to this configuration, since both the sucked air in the sheet ejection unit 5 and the sucked air in the upper portion of the fixing unit 20 can be passed through the filter, UFPs, VOC, and odor can be effectively collected and removed.

The filter 22 may be disposed, for example, between the blower 42 of the outside air suction duct 4 and the exhaust port 23.

Thus, such a configuration in which the air containing hazardous substances sucked from the sheet ejection unit 5 is passed through the filter 22 and emitted outside of the image forming apparatus 10 again can effectively reduce the amount of hazardous substances.

Operation Example of Controlling an Image Forming Apparatus According to an Embodiment of the Present Disclosure Next, a description is given of a printing process of performing simplex printing and duplex printing and an operation example of controlling the blower 42 and the like when performing the printing process in the image forming apparatus 10. First, a controller included in the image forming apparatus 10 is described. The image forming apparatus 10 according to an embodiment of the present disclosure includes a controller 100 as control circuitry that controls the entire image forming apparatus 10 and controls execution of each function.

Figure 5:
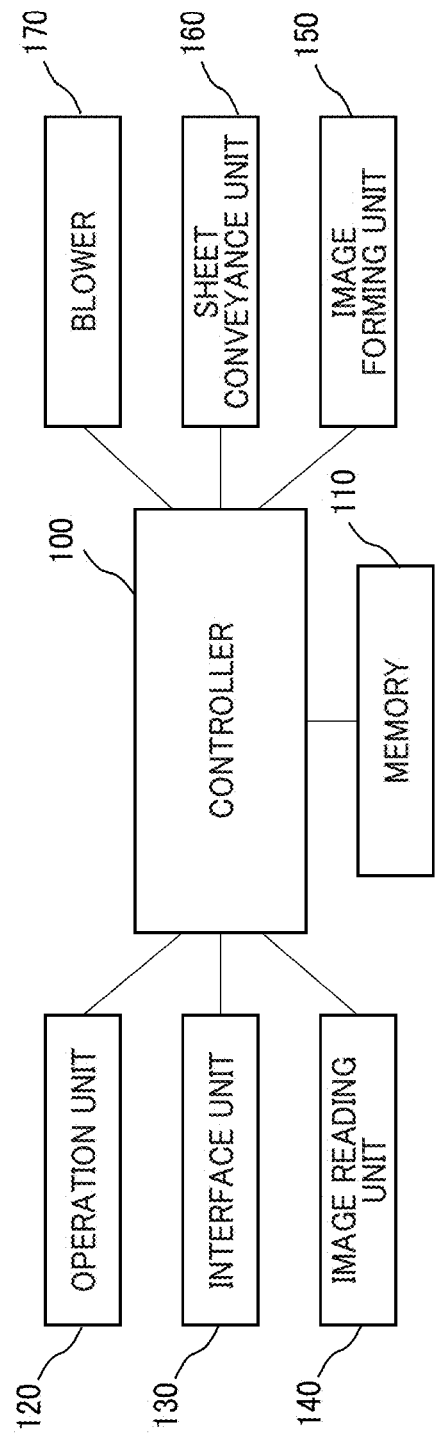
FIG. 5 is a diagram of an example of functional blocks controlled by a controller.

FIG. 5 is a diagram of an example of functional blocks controlled by the controller 100.

The controller 100 controls a printing operation, an image reading operation, and the like. The controller 100 controls operations of an operation unit 120, an interface (I/F) unit 130, an image reading unit 140, an image forming unit 150, a sheet conveyance unit 160, and a blower 170 by using, for example, a memory 110.

The controller 100 includes, for example, a central processing unit (CPU), a random access memory (RAM), and a read only memory (ROM).

The CPU executes various programs and controls the entire image forming apparatus 10 based on arithmetic processing and control programs.

The RAM is a volatile storage medium to read and write information at high speed, and functions as a work area when the CPU executes a program.

The ROM is a read-only nonvolatile storage medium in which various programs and control programs are stored.

The memory 110 is a storage unit that temporarily or permanently holds data and the like under the control of the image forming apparatus 10.

The operation unit 120 is a unit operated by a user to perform operations and instructions such as printing and scanning of an image. For example, the operation panel 6 of FIG. 1 can be used as the operation unit 120.

The I/F unit 130 is an interface that includes a terminal capable of communicating with the outside, such as a universal serial bus (USB), a local area network (LAN), or WiFi, and transmits and receives data.

The image reading unit 140 has a function of reading documents by a scanner, an ADF, or the like and converting the read document into image data.

The image forming unit 150 is a device that transfers and outputs desired image data to a recording medium when there is a print instruction. The image forming unit 150 includes, for example, a toner image forming device 15, a transfer device 16, and a fixing device 17 illustrated in FIG. 2.

The sheet conveyance unit 160 is a device that conveys a recording medium to be output. The sheet conveyance unit 160 has a function of performing conveyance for simplex printing or conveyance for duplex printing in accordance with an instruction from the controller 100.

The blower 170 has a function of generating an airflow (for example, a fan) in the image forming apparatus 10 for cooling, dehumidification, or the like. The above-described blower 42 is an example.

Hereinafter, the control of operation time of the blower 42 by the controller 100 is described.

Figure 6:
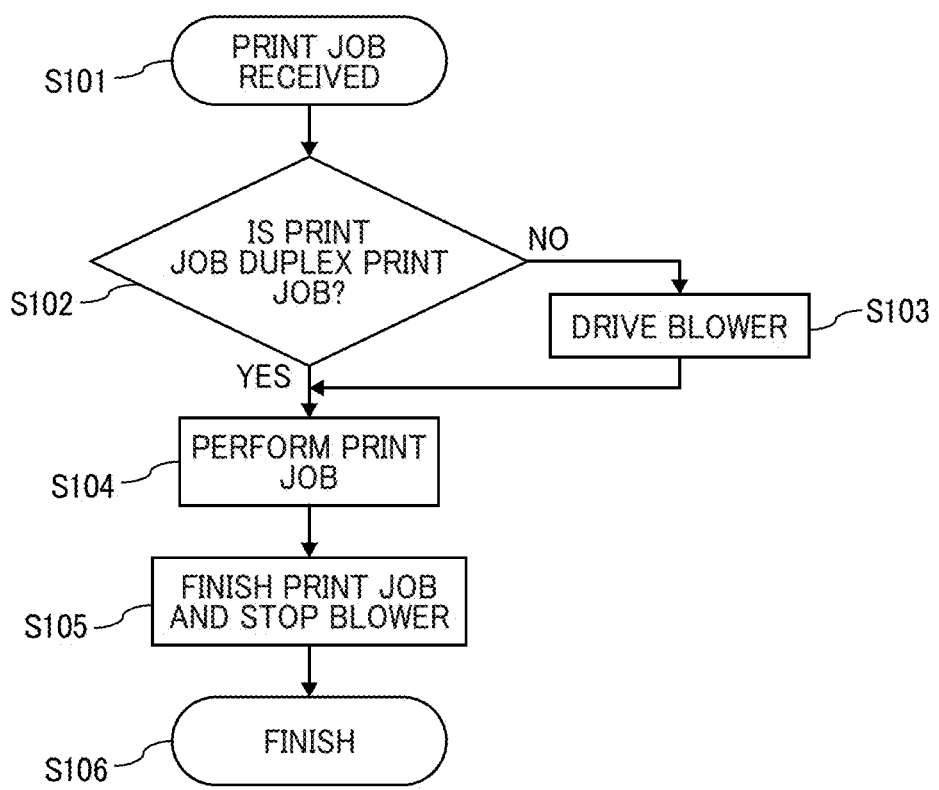
FIG. 6 is a flowchart of an operation example of controlling the operation of a blower according to a printing mode.

FIG. 6 is a flowchart of a process of controlling the operation of the blower 42 according to the printing mode.

The blower 42 is assumed to be, for example, a fan. When the fan is operated, an increase in power consumption, an increase in noise, and the like occur. Therefore, it is desirable to perform control to shorten the operation time as much as possible.

In the image forming apparatus 10, generation of the condensation image often occurs at the time of duplex printing immediately after simplex printing. However, in a case in which duplex printing is continued, since heated sheets pass through almost all of the conveyance paths, water droplets evaporate due to temperature, or the heated sheets absorb the water droplets and the sheets are ejected as is. Thus, a condensation image is less likely to occur.

For this reason, performing the air blowing only during the simplex printing even when the blower is not operated during the duplex printing enables to reduce the operation time of the fan while the target dew condensation image is eliminated. Such an arrangement as described above is effective in preventing the water droplets from being accumulated during simplex printing. Accordingly, limiting the operation of the blower 42 only during simplex printing can obtain an effect of reducing power consumption and noise.

Specifically, an operation example of controlling the operation time of the blower 42 according to either duplex printing or simplex printing is described. When a print operation instruction is received via the operation unit 120, the I/F unit 130, or the like, the controller 100 starts control as a received print job (S101). The controller 100 determines whether a print command is a duplex print job or simplex print job (S102). When the print command is a simplex print job (NO in S102). The operation of the blower 42 is started (S103), and in the case of duplex printing (YES in S102), the operation of the blower 42 is not performed. The image forming apparatus 10 performs the print operation (S104), and after the print operation ends, the controller 100 stops the operation of the blower 42 (S105) and ends the control (S106). In a case in which print commands are continuously input to the image forming apparatus 10, the controller 100 performs the above described control for each print job command and starts over from S101.

Next, an operation example of the control of the operation start time of the blower 42 is described.

Figure 7:
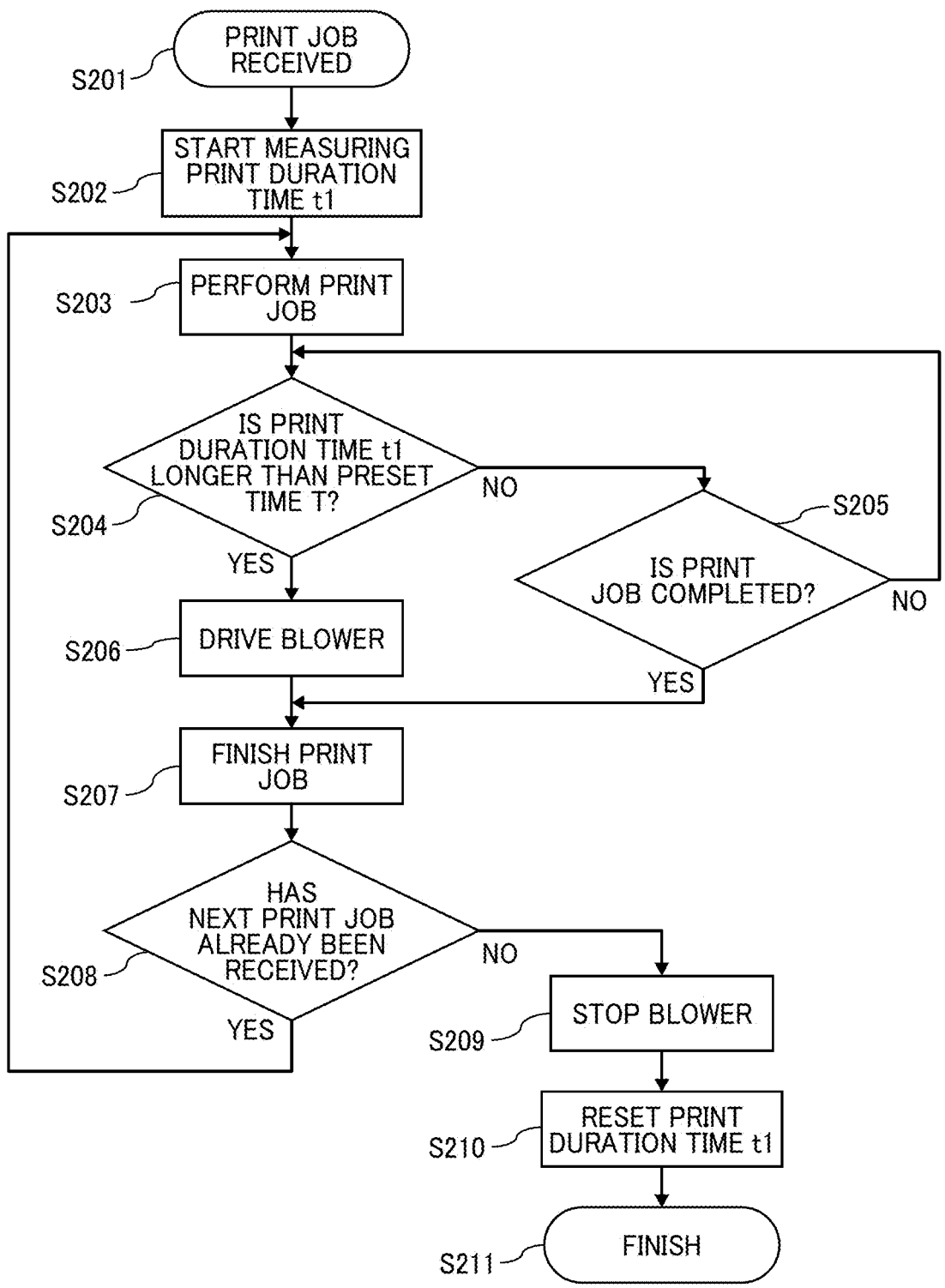
FIG. 7 is a flowchart of an operation example in which the operation of the blower is started after a preset time has elapsed.

FIG. 7 is a flowchart of an operation example in which the operation of the blower 42 is started after a preset time T has elapsed.

In the image forming apparatus 10, when several sheets are printed, the amount of water vapor discharged from the sheet after fixing and the amount of hazardous substances such as UFPs, VOC, and odor emitted outside of the image forming apparatus 10 are smaller in comparison with the amount of water vapor discharged from the sheets in continuous printing for a long time. When a plurality of sheets are continuously printed for a long time, the adhesion of water droplets to the conveying members and the discharge of hazardous substances become remarkable. Therefore, even if the blower 42 is not operated, it is expected that the dew condensation image is not generated and the emission amount of the hazardous substances is small. Accordingly, performing control such that the blower 42 is not operated for several print jobs enables to realize both prevention of an increase in noise and power consumption due to the operation of the blower 42 and prevention of the occurrence of abnormal images.

A specific operation example of the control is described with reference to FIG. 7. When a print duration time t1 exceeds a preset time T with respect to any preset time T, the blower 42 is controlled to be operated. Here, a value set in advance as the preset time T is held, for example, in a recording area or the like that can be referred to by the controller 100. The print duration time t1 is, for example, a time measured by a timer provided in the controller 100.

As in step S101 of FIG. 6, after receiving a print job (S201), the controller 100 starts a timer to check the print duration time (S202) and measures the print duration time t1. At the same time, the print operation is started (S203). The controller 100 determines whether the print duration time t1 has reached the preset time T (S204). When the print duration time t1 has not reached the preset time T (t1<T and NO in S204), the controller 100 checks whether the print is continued (S205). If the print is continued (NO in S205), the process returns to step S204 again and the print duration time t1 is compared again with the preset time T. When the print operation is completed (YES in S205), the process proceeds to step S207, and the subsequent process is performed.

When the print duration time t1 has reached the preset time T (t1≥T) in step S204 (YES in S204), the controller 100 starts the operation of the blower 42 (S206), proceeds to step S207, and performs the subsequent processing. The operation of the blower 42 is continued until the end of printing.

The controller 100 executes the print operation of one received print job and ends the operation (S207).

In the image forming apparatus 10, there may be a case in which a plurality of print jobs is accumulated in the image forming apparatus 10 (YES in S208), and the plurality of print jobs are continuously processed, and the printing may appear to be continued. In such a case, the controller 100 returns to step S203 while holding a value of the print duration time t1, and continuously executes a next print job (YES in S208).

On the other hand, if there is no next print job (NO in S208), the controller 100 stops the blower 42 (S209), resets the print duration time t1 (S210), and ends the control (S211).

As an alternative to controlling the operation of the blower 42 based on the magnitude relation between the print duration time t1 and the preset time T, a determination based on the number of prints may be used. During printing, an image quality adjustment operation or an operation failure such as a paper jam might occur, and it may be undesirable to determine the operation control of the blower 42 based on the printing duration time. Alternatively, the print duration time t1 and the preset time T in the flowchart of FIG. 9 may be replaced with the total number of prints and a reference number of prints. Thus, the operation timing of the blower 42 can be determined without being affected by the image quality adjustment operation during printing or an operation failure such as a paper jam. Accordingly, generation of a condensation image can be prevented while restraining noise.

Figure 8:
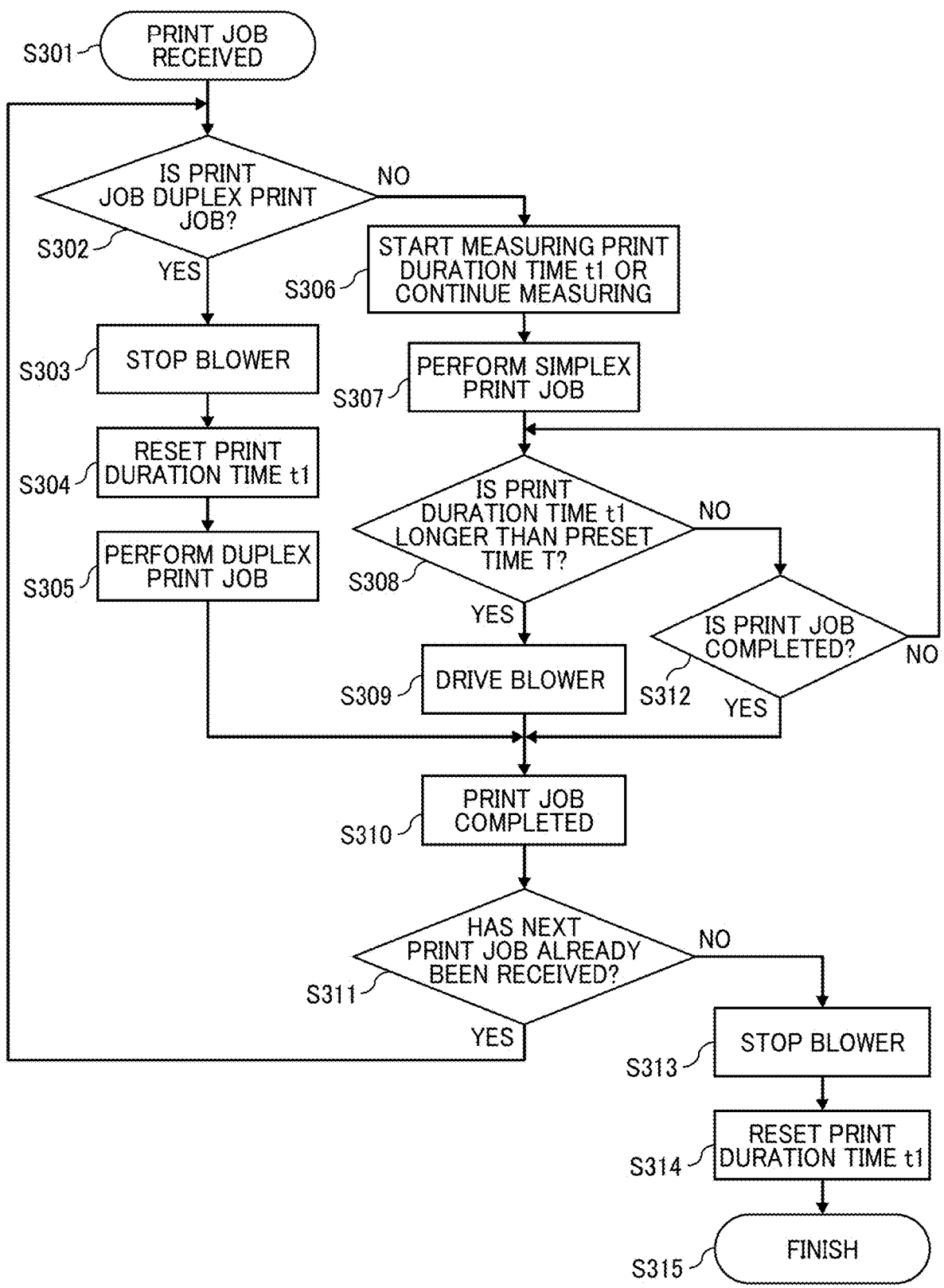
FIG. 8 is a flowchart of an operation example of controlling the operation of the blower according to an elapsed time after the start of printing and the printing mode.

Next, with reference to FIG. 8, an operation example of the operation control of the blower 42 according to the print duration time t1 elapsed after the start of printing and the printing mode is described.

As a combined form of the operation examples illustrated in FIG. 6 and FIG. 7, an operation example of a specific method of controlling to operate the blower 42 after the preset time T and at the time of simplex printing is described.

As in step S101 of FIG. 6, after receiving the print job (S301), the controller 100 determines the format of the print job (S302).

When the print job is duplex printing (YES in S302), the controller 100 does not operate the blower 42 (stops the blower 42 in S303), resets the print duration time t1 (S304), and performs the duplex print operation (S305). In step S304, the print duration time t1 is reset on the assumption that the duplex printing is performed immediately after the simplex printing.

On the other hand, in the case of simplex printing (NO in S302), the controller 100 starts a timer and starts measurement of the print duration time t1 (S306). When the timer has already started and the print duration time t1 is being measured (YES in step S311 described later), the controller 100 continues the measurement of the print duration time t1.

The controller 100 starts a simplex print operation (S307).

The operation from step S308 to step S310 and the operation in step S312 are the same as those in steps S204, S206, S207, and S205 in FIG. 7, and thus description thereof is omitted.

After the print operation of one print job is completed (S310), the controller 100 determines whether a next print job is reserved (S311). When there is no next print job reserved (NO in S311), the controller 100 stops the blower 42 (S313), resets the print duration time t1 (S314) and ends the control (S315).

If there is a next print job reserved (YES in S311), the process returns to step S302 to determine the format of the print job (i.e. duplex printing or simplex printing).

In the case of simplex printing (NO in S302), the controller 100 advances the process to step S308 while maintaining the state (i.e., operating state or stopped state) of the blower 42. Since the subsequent operations are the same, the description thereof is omitted.

In the case of duplex printing (YES in S302), the controller 100 stops the blower 42 (S303), resets the print duration time t1 for a next simplex print job (S304), performs the duplex print job (S305), and proceeds to step S310. Since the subsequent operations are the same, the description thereof is omitted.

As described above, in a case in which the simplex print jobs are continuously performed, the operation of the blower 42 can be started only after the preset time T has elapsed from the start of the simplex print job. Measuring the print duration time t1 only after the simplex print job is started can further increase effects to reduce the print power consumption and noise.

The operation examples described with reference to FIGS. 6 to 8 can be realized by, for example, a program. The program may be stored in a read only memory (ROM) in advance. Alternatively, the image data may be received from outside via the I/F unit 130 or the like and held in a storage area (for example, the memory 110) of the image forming apparatus 10. In the controller 100, the central processing unit (CPU) loads a program stored in the ROM or another storage area and executes a group of instructions of the program using the random access memory (RAM) as a work area, thereby implementing the above-described operation example.

According to the above-described embodiment, both the reduction of the amount of hazardous substances and the prevention can be realized at the same time.

The present disclosure is not limited to the embodiments described above. Within the scope of the present disclosure, it is possible to modify, add, and convert each element of the above-described embodiments to contents that can be easily considered by those skilled in the art.

In the above descriptions, the term "printing" in the present disclosure may be used synonymously with, e.g. the terms of "image formation", "recording", "printing", and "image printing".

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus configured to perform simplex printing and duplex printing, the apparatus comprising:
   a fixing unit configured to fix a toner image to a recording medium;
   a recording medium ejection device including:
      a recording medium outlet through which the recording medium is to be ejected outside of the image forming apparatus, and
      a recording medium reverse port through which a part of the recording medium is to be ejected outside of the image forming apparatus to reverse the recording medium in the duplex printing; and
   a suction duct having a suction port configured to suck air;
   a blower disposed in the suction duct and configured to suck air from the recording medium ejection device to the suction port;
   a pair of rotating members disposed between the suction port and the recording medium reverse port, the pair of rotating members being configured to reverse both sides of the recording medium in the duplex printing; and
   wherein the suction duct includes an opening between the suction port and the blower, the opening in a vicinity of a longitudinal end of the fixing unit, and the suction duct includes a filter configured to discharge merged air sucked from both the suction port and the opening, outside of the image forming apparatus.

2. The image forming apparatus according to claim 1, further comprising a fixing device configured to fix an image on the recording medium,
   wherein the suction duct is configured to suck air around the fixing device.

3. An image forming apparatus configured to perform simplex printing and duplex printing, the apparatus comprising:
- a recording medium ejection device including:
  - a recording medium outlet through which a recording medium is to be ejected outside of the image forming apparatus, and
  - a recording medium reverse port through which a part of the recording medium is to be ejected outside of the image forming apparatus to reverse the recording medium in the duplex printing; and
- a suction duct having a suction port configured to suck air;
- a blower disposed in the suction duct and configured to suck air from the recording medium ejection device to the suction port; and
- a pair of rotating members disposed between the suction port and at least one of the recording medium outlet and the recording medium reverse port, the pair of rotating members being configured to reverse both sides of the recording medium in the duplex printing;
- control circuitry configured to stop the blower in a case in which the duplex printing is performed.

4. The image forming apparatus according to claim 3, wherein the control circuitry is configured to stop the blower at a start of printing and start an operation of the blower after a preset time has elapsed from the start of printing.

5. The image forming apparatus according to claim 3, wherein the control circuitry is configured to stop the blower at a start of the simplex printing and start an operation of the blower after a preset time elapses from the start of the simplex printing.

6. The image forming apparatus according to claim 3, wherein the control circuitry is configured to set the blower to an operating state after a preset number of sheets has been printed from the start of the simplex printing.

* * * * *